US012380681B2

United States Patent
Dong et al.

(10) Patent No.: US 12,380,681 B2
(45) Date of Patent: Aug. 5, 2025

(54) METHOD FOR TRAINING FEATURE EXTRACTION MODEL, METHOD FOR CLASSIFYING IMAGE, AND RELATED APPARATUSES

(71) Applicant: Beijing Baidu Netcom Science Technology Co., Ltd., Beijing (CN)

(72) Inventors: Shuilong Dong, Beijing (CN); Sensen He, Beijing (CN); Shengyu Wei, Beijing (CN); Cheng Cui, Beijing (CN); Yuning Du, Beijing (CN); Tingquan Gao, Beijing (CN); Shao Zeng, Beijing (CN); Ying Zhou, Beijing (CN); Xueying Lyu, Beijing (CN); Yi Liu, Beijing (CN); Qiao Zhao, Beijing (CN); Qiwen Liu, Beijing (CN); Ran Bi, Beijing (CN); Xiaoguang Hu, Beijing (CN); Dianhai Yu, Beijing (CN); Yanjun Ma, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 386 days.

(21) Appl. No.: 18/183,590

(22) Filed: Mar. 14, 2023

(65) Prior Publication Data

US 2023/0215148 A1    Jul. 6, 2023

(30) Foreign Application Priority Data

Sep. 29, 2022    (CN) .......................... 202211204233.4

(51) Int. Cl.
*G06V 10/774*    (2022.01)
*G06V 10/40*    (2022.01)
(Continued)

(52) U.S. Cl.
CPC ............ *G06V 10/774* (2022.01); *G06V 10/40* (2022.01); *G06V 10/761* (2022.01);
(Continued)

(58) Field of Classification Search
CPC .... G06V 10/774; G06V 10/40; G06V 10/761; G06V 10/764; G06V 10/776; G06V 10/7784; G06V 10/454; G06V 10/82
See application file for complete search history.

(56) References Cited

U.S. PATENT DOCUMENTS

| | | | |
|---|---|---|---|
| 10,573,022 B2 * | 2/2020 | Hatanaka | G06F 16/5854 |
| 11,113,586 B2 * | 9/2021 | Wang | G06N 3/045 |

(Continued)

FOREIGN PATENT DOCUMENTS

| | | |
|---|---|---|
| CN | 108805151 A | 11/2018 |
| CN | 113255694 A | 8/2021 |

(Continued)

OTHER PUBLICATIONS

Google Translation of WO/2019/120115 to Yan et al. (Year: 2019).*

(Continued)

*Primary Examiner* — Aaron W Carter
(74) *Attorney, Agent, or Firm* — Seed IP Law Group LLP

(57) ABSTRACT

The present disclosure provides a method for training a feature extraction model, a method for classifying an image and related apparatuses, and relates to the field of artificial intelligence technology such as deep learning and image recognition. The scheme comprises: extracting an image feature of each sample image in a sample image set using a basic feature extraction module of an initial feature extraction model, to obtain an initial feature vector set; performing normalization processing on each initial feature vector in the initial feature vector set using a normalization processing module of the initial feature extraction model, to obtain each (Continued)

normalized feature vector; and guiding training for the initial feature extraction model through a preset high discriminative loss function, to obtain a target feature extraction model as a training result.

20 Claims, 5 Drawing Sheets

(51) Int. Cl.
  *G06V 10/74* (2022.01)
  *G06V 10/764* (2022.01)
  *G06V 10/776* (2022.01)
  *G06V 10/778* (2022.01)
(52) U.S. Cl.
  CPC .......... *G06V 10/764* (2022.01); *G06V 10/776* (2022.01); *G06V 10/7784* (2022.01)

(56) References Cited

U.S. PATENT DOCUMENTS

| | | | | |
|---|---|---|---|---|
| 11,947,570 | B2* | 4/2024 | Wang | G06N 20/00 |
| 2012/0047040 | A1* | 2/2012 | Ueda | G07G 1/0045 |
| | | | | 705/23 |
| 2020/0042770 | A1* | 2/2020 | Yan | G06V 40/172 |
| 2022/0053010 | A1* | 2/2022 | Elyashiv | G06N 3/088 |
| 2022/0083809 | A1 | 3/2022 | Aggarwal et al. | |
| 2023/0022387 | A1* | 1/2023 | Shen | G06V 20/41 |
| 2023/0215148 | A1* | 7/2023 | Dong | G06V 10/776 |
| | | | | 382/159 |
| 2024/0144646 | A1* | 5/2024 | Sorakado | G06V 40/171 |
| 2024/0296671 | A1* | 9/2024 | Patsekin | G06F 18/41 |
| 2024/0411964 | A1* | 12/2024 | Wang | G06Q 10/06 |

FOREIGN PATENT DOCUMENTS

| | | |
|---|---|---|
| CN | 113378911 A | 9/2021 |
| CN | 113947701 A | 1/2022 |
| JP | 2012-43371 A | 3/2012 |
| JP | 2018-45390 A | 3/2018 |
| JP | 2018-147392 A | 9/2018 |
| WO | 2019/119505 A1 | 6/2019 |

OTHER PUBLICATIONS

Cheng et al., "When Deep Learning Meets Metric Learning: Remote Sensing Image Scene Classification via Learning Discriminative CNNs," IEEE Transactions on Geoscience and Remote Sensing, vol. 56, No. 5, May 2018.

* cited by examiner

METHOD FOR TRAINING FEATURE EXTRACTION MODEL, METHOD FOR CLASSIFYING IMAGE, AND RELATED APPARATUSES

CROSS-REFERENCE TO RELATED APPLICATIONS

This application claims priority to Chinese Patent Application No. 202211204233.4, filed with the China National Intellectual Property Administration (CNIPA) on Sep. 29, 2022, the contents of which are incorporated herein by reference in their entirety.

TECHNICAL FIELD

The present disclosure relates to the field of image processing technology, specifically to the field of artificial intelligence technology such as deep learning and image recognition, and particularly to a method for training a feature extraction model, a method for classifying an image, corresponding apparatuses, an electronic device, a computer readable storage medium and a computer program product.

BACKGROUND

In order to improve the effect of recognizing the categories to which images belong, image recognition models or image classification models constructed based on machine learning and deep learning technologies have gradually begun to be used on a large scale.

SUMMARY

Embodiments of the present disclosure propose a method and apparatus for training a feature extraction model, a method and apparatus for classifying an image, an electronic device, a computer readable storage medium and a computer program product.

In a first aspect, embodiments of the present disclosure provide a method for training a feature extraction model, comprising: extracting an image feature of each sample image in a sample image set using a basic feature extraction module of an initial feature extraction model, to obtain an initial feature vector set, wherein the sample image set contains sample images of a plurality of image categories, and the each sample image is annotated with an image category to which the sample image belongs; performing normalization processing on each initial feature vector in the initial feature vector set using a normalization processing module of the initial feature extraction model, to obtain each normalized feature vector; and guiding training for the initial feature extraction model through a preset high discriminative loss function, to obtain a target feature extraction model as a training result, wherein the high discriminative loss function is abstractly obtained based on a preset upper limit and a preset lower limit of a vector similarity that are preset respectively for sample images of any two image categories according to whether two images have a similarity, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

In a second aspect, embodiments of the present disclosure provide an apparatus for training a feature extraction model, comprising: an image feature extracting unit, configured to extract an image feature of each sample image in a sample image set using a basic feature extraction module of an initial feature extraction model, to obtain an initial feature vector set, wherein the sample image set contains sample images of a plurality of image categories, and the each sample image is annotated with an image category to which the sample image belongs; a normalization processing unit, configured to perform normalization processing on each initial feature vector in the initial feature vector set using a normalization processing module of the initial feature extraction model, to obtain each normalized feature vector; and a high discriminative loss function training unit, configured to guide training for the initial feature extraction model through a preset high discriminative loss function, to obtain a target feature extraction model as a training result, wherein the high discriminative loss function is abstractly obtained based on a preset upper limit and a preset lower limit of a vector similarity that are preset respectively for sample images of any two image categories according to whether two images have a similarity, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

In a third aspect, embodiments of the present disclosure provide a method for classifying an image, comprising: acquiring a to-be-classified image; obtaining an outputted actual normalized feature vector by inputting the to-be-classified image into a preset target feature extraction model, wherein the target feature extraction model is obtained according to the method for training a feature extraction model provided by the first aspect; calculating respectively a vector similarity between the actual normalized feature vector and a standard normalized feature vector of each image category in a feature vector library; and determining an image category to which the to-be-classified image belongs according to a size of the vector similarity.

In a fourth aspect, embodiments of the present disclosure provide an apparatus for classifying an image, comprising: a to-be-classified image acquiring unit, configured to acquire a to-be-classified image; an actual feature vector acquiring unit, configured to obtain an outputted actual normalized feature vector by inputting the to-be-classified image into a preset target feature extraction model, wherein the target feature extraction model is obtained according to the apparatus for training a feature extraction model provided by the second aspect; a vector similarity calculating unit, configured to calculate respectively a vector similarity between the actual normalized feature vector and a standard normalized feature vector of each image category in a feature vector library; and an image category determining unit, configured to determine an image category to which the to-be-classified image belongs according to a size of the vector similarity.

In a fifth aspect, embodiments of the present disclosure provide an electronic device, comprising: one or more processors; and a memory, storing one or more programs, wherein the one or more programs, when executed by the one or more processors, cause the one or more processors to implement the method for training a feature extraction model provided by the first aspect or the method for classifying an image provided by the third aspect.

In a sixth aspect, embodiments of the present disclosure provide a computer-readable medium, storing a computer program thereon, wherein the program, when executed by a processor, causes the processor to implement the method for training a feature extraction model provided by the first aspect for classifying an image provided by the third aspect.

In a seventh aspect, an embodiment of the present disclosure provides a computer program product, comprising a computer program, wherein the computer program, when executed by a processor, implements the method for training a feature extraction model provided by the first aspect for classifying an image provided by the third aspect.

According to the method for training a feature extraction model and the method for classifying an image provided in the embodiments of the present disclosure, on the basis that the normalization processing module is added to perform the normalization processing on the initial feature vector outputted by the basic feature extraction module, the preset high discriminative loss function is additionally introduced. The high discriminative loss function is abstractly obtained based on the preset upper limit and the preset lower limit of the vector similarity that are preset respectively for the sample images of any two image categories according to whether the two images have the similarity, and the preset upper limit is greater than the preset lower limit. Therefore, the feature extraction model can be guided in generating image feature vector having a significant discrimination when the vector similarity is calculated, which is conducive to obtaining a more accurate image classification result of a category to which an image belongs.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

Through detailed descriptions of non-limiting embodiments given with reference to the following accompanying drawings, other features, objectives, and advantages of the present disclosure will be more apparent.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description. It should be noted that the embodiments in the present disclosure and the features in the embodiments may be combined with each other on a non-conflict basis.

In the technical solution of the present disclosure, the collection, storage, use, processing, transmission, provision, disclosure, etc. of the personal information of a user all comply with the provisions of the relevant laws and regulations, and do not violate public order and good customs.

Figure 1:
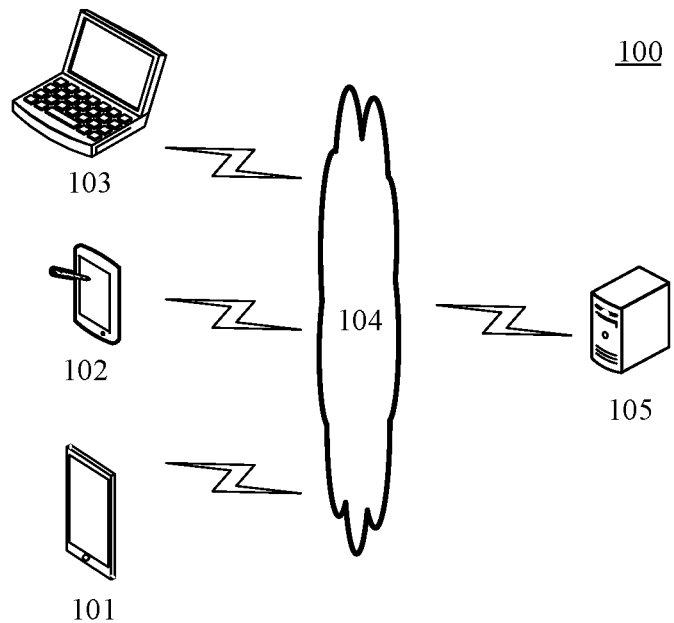
FIG. 1 illustrates an exemplary system architecture in which the present disclosure may be applied.

FIG. 1 illustrates an exemplary system architecture 100 in which an embodiment of a method for training a feature extraction model, a method for classifying an image, mating apparatuses, an electronic device and a computer readable storage medium according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send messages, etc. On the terminal devices 101, 102 and 103 and the server 105, various applications (e.g., a model training application, an image recognition application, and a data transmission application) for implementing information communication therebetween may be installed.

The terminal devices 101, 102 and 103 and the server 105 may be hardware or software. When being the hardware, the terminal devices 101, 102 and 103 may be various electronic devices having a display screen, the electronic devices including, but not limited to, a smartphone, a tablet computer, a laptop portable computer, a desktop computer, and the like. When being the software, the terminal devices 101, 102 and 103 may be installed in the above electronic devices. The terminal devices may be implemented as a plurality of pieces of software or a plurality of software modules, or may be implemented as a single piece of software or a single software module, which will not be specifically limited here. When being the hardware, the server 105 may be implemented as a distributed server cluster composed of a plurality of servers, or may be implemented as a single server. When being the software, the server 105 may be implemented as a plurality of pieces of software or a plurality of software modules, or may be implemented as a single piece of software or a single software module, which will not be specifically limited here.

The server 105 can provide various services through various built-in applications. An image recognition application that can provide an image category determination service for the user is taken as an example. When running the image recognition application, the server 105 can achieve the following effects. First, a to-be-classified image inputted by the terminal devices 101, 102 and 103 is received via the network 104. Then, an outputted actual normalized feature vector is obtained by inputting the to-be-classified image into a preset target feature extraction model. Next, a vector similarity between the actual normalized feature vector and a standard normalized feature vector of each image category in a feature vector library is respectively calculated. Finally, an image category to which the to-be-classified image belongs is determined according to a size of the vector similarity. Thus, the determined image category can be returned to the terminal devices 101, 102 and 103 via the network 104.

Here, the target feature extraction model can be trained and obtained by a built-in model training application of the server 105 according to the following steps. An image feature of each sample image in a sample image set is extracted using a basic feature extraction module of an initial feature extraction model, to obtain an initial feature vector set, wherein the sample image set contains sample images of a plurality of image categories, and the each sample image is annotated with an image category to which the sample image belongs; normalization processing is performed on each initial feature vector in the initial feature vector set using a normalization processing module of the initial feature extraction model, to obtain each normalized feature vector; and training for the initial feature extraction model is guided through a preset high discriminative loss function, to obtain a target feature extraction model as a training result, wherein the high discriminative loss function is abstractly obtained based on a preset upper limit and a preset lower limit of a vector similarity that are preset respectively for sample images of any two image categories according to whether two images have a similarity, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

Since there is a need for many computing resources and a strong computing capability to train and obtain the target feature extraction model, the method for training a feature extraction model provided by the subsequent embodiments of the present disclosure is generally performed by the server 105 having a strong computing capability and many computing resources. Correspondingly, the apparatus for training a feature extraction model is generally provided in the server 105. However, at the same time, it should also be noted that, when having a computing capability and computing resources that satisfy requirements, the terminal devices 101, 102 and 103 can also complete, through the model training application installed thereon, the computations originally performed by the server 105, to output the same result as that of the server 105. Correspondingly, the apparatus for training a feature extraction model can alternatively be provided in the terminal devices 101, 102 and 103. In this case, the exemplary system architecture 100 may alternatively not include the server 105 and the network 104.

Clearly, the server used to train and obtain the target feature extraction model may be different from the server calling the trained target feature extraction model for use. In particular, the target feature extraction model trained by the server 105 can also obtain a lightweight target feature extraction model suitable for placement in the terminal devices 101, 102 and 103 through a model distillation approach. That is, according to the actually required recognition accuracy, it is possible to flexibly choose to use the lightweight target feature extraction model in the terminal devices 101, 102 and 103 or to use the more complex target feature extraction model in the server 105.

It should be appreciated that the numbers of the terminal devices, the networks and the servers in FIG. 1 are merely illustrative. Any number of terminal devices, networks and servers may be provided based on actual requirements.

Figure 2:
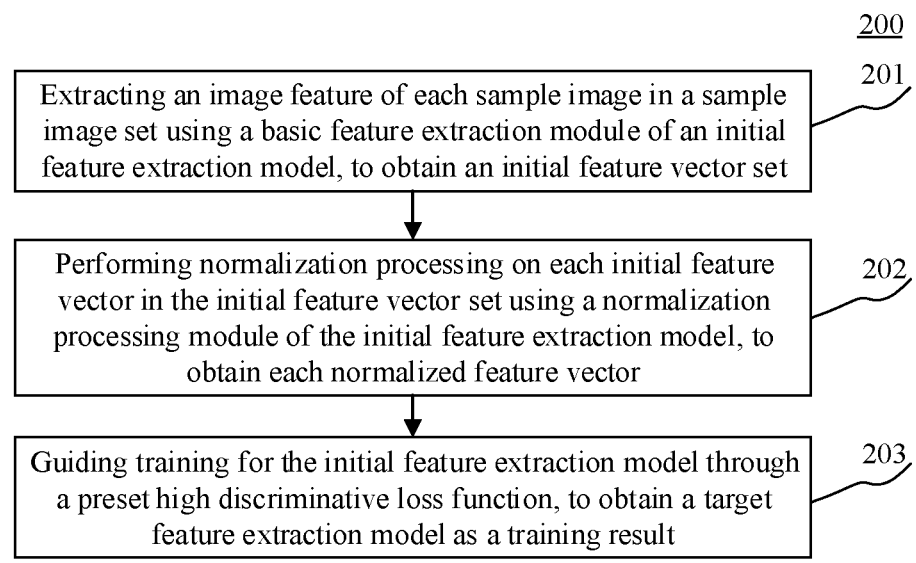
FIG. 2 is a flowchart of a method for training a feature extraction model provided by an embodiment of the present disclosure.

Referring to FIG. 2, FIG. 2 is a flowchart of a method for training a feature extraction model provided by an embodiment of the present disclosure. Here, a flow 200 includes the following steps:

Step 201, extracting an image feature of each sample image in a sample image set using a basic feature extraction module of an initial feature extraction model, to obtain an initial feature vector set.

This step is intended to input, by an executing body (e.g., the server 105 shown in FIG. 1) of the method for training a feature extraction model, a sample image set containing a plurality of sample images into the basic feature extraction module in the initial feature extraction model (i.e., an original model not trained by a training sample) to obtain an initial feature vector outputted by the basic feature extraction module for the each sample image, and perform an aggregation to obtain the initial feature vector set.

Here, the sample image set contains sample images of a plurality of image categories, and each sample image is annotated with an image category to which the sample image belongs. The annotation may be attached to a tag on the sample image or represented in another form. The basic feature extraction module is an existing functional module used to extract an image feature from an image, and generally contains a convolutional layer, a pooling layer, possibly existing up-sampling and down-sampling layers, etc. In addition to being represented in a form of a vector, the result of a feature extraction operation performed by the module may be represented in a form of a matrix or a feature map. Here, only the feature vector is taken as a specific example, and other representation forms may be used instead in practice without affecting the final result obtained through subsequent steps.

Step 202, performing normalization processing on each initial feature vector in the initial feature vector set using a normalization processing module of the initial feature extraction model, to obtain each normalized feature vector.

Based on step 201, this step is intended to input, by the above executing body, the initial feature vector set outputted by the basic feature extraction module into the normalization processing module (i.e., the input end of the normalization processing module is connected to the output end of the basic feature extraction module) of the initial feature extraction model, to perform the normalization processing on the each initial feature vector in the initial feature vector set through the normalization processing module, thereby obtaining the each normalized feature vector outputted by the normalization processing module.

Here, the normalization processing is performed to eliminate the performance difference between sample images having different sources after the feature extraction operation of the basic feature extraction module, to correct the each initial feature vector in the initial feature vector set to a small performance range, thereby facilitating subsequent processing.

Step 203, guiding training for the initial feature extraction model through a preset high discriminative loss function, to obtain a target feature extraction model as a training result.

Based on step 202, this step is intended to guide, by the above executing body, the training for the initial feature extraction model through the preset high discriminative loss function to obtain the target feature extraction model as the training result. Here, the high discriminative loss function is abstractly obtained based on a preset upper limit and a preset lower limit of a vector similarity that are preset respectively for sample images of any two image categories according to whether two images have a similarity. That is, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

For example, for images of three categories A, B and C, an image of a category A and an image of a category B may be considered to have a similarity, and an image of a category C may be considered to not have a similarity to the image of the category B. Accordingly, it may be preset for the image of the category A and the image of the category B that the vector similarity between the normalized feature vectors of the images should be greater than 80% (i.e., the preset upper limit) when the two images have a similarity, and similarly, it may be preset for the image of the category C and the image of the category B that the vector similarity between the normalized feature vectors of the images should be less than 30% (i.e., the preset lower limit) when the two images do not have a similarity, thereby obtaining a determination result that the images are obviously similar or dissimilar, rather than any one case where the similarity is evenly distributed between 0% and 100% when a similarity determination is performed on the normalized feature vectors of two kinds of images, which makes it difficult to define whether the two have a similarity. In general, the purpose of setting the high discriminative loss function is to make the image features corresponding to the two categories of images that should be similar have a high vector similarity as much as possible, and conversely, to make the image features corresponding to the two categories of images that are not similar have a low vector similarity as much as possible, which makes the belonging determination result of an image category more straightforward rather than paradoxical. It should be noted that if the feature vectors corresponding to two images have a similarity, it may be considered in the subsequent actual application that a to-be-processed image belongs to the image of this category, and conversely, it may be considered that it cannot be determined that the to-be-processed image belongs to this image category.

Specifically, whether the two categories of images have a similarity can be defined in the present disclosure as whether the image objects described by the two categories of images have a small difference in at least one dimension. Here, the dimension can include a size, a shape, a color, a use, a usage, and the like of an image object, and a similarity influencing factor (e.g., a color distribution, and a generation source) defined by a user in an actual application scenario. For example, for a green apple image and a red apple image, since the two images only have a difference in colors and little different in the remaining dimensions, the two images can be considered to belong to two categories of images that have a similarity. On the contrary, for a pink peach image and a green apple image, since the two images refer to edible fruits in the dimension of usage and have a significant difference in the other dimensions, the two images can be considered to belong to two categories of images that do not have a similarity.

Preferably, the similarity difference between the preset upper limit and the preset lower limit is not less than half of a complete similarity interval. For example, the preset upper limit may be 83%, and the preset lower limit may be 31%, and the similarity difference between the two is 52%, which is greater than half (50%) of the complete similarity interval (100%), thereby making the discrimination significant enough.

According to the method for training a feature extraction model provided in the embodiment of the present disclosure, on the basis that the normalization processing module is added to perform the normalization processing on the initial feature vector outputted by the basic feature extraction module, the preset high discriminative loss function is additionally introduced. The high discriminative loss function is abstractly obtained based on the preset upper limit and the preset lower limit of the vector similarity that are preset respectively for the sample images of any two image categories according to whether the two images have the similarity, and the preset upper limit is greater than the preset lower limit. Therefore, the feature extraction model can be guided in generating image feature vector having a significant discrimination when the vector similarity is calculated.

Figure 3:
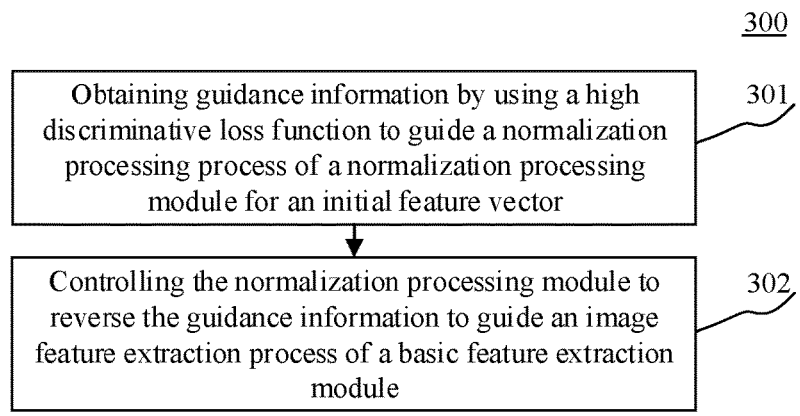
FIG. 3 is a flowchart of a method for guiding training for a feature extraction model using a high discriminative loss function provided by an embodiment of the present disclosure.

In order to deepen understanding of the process of how to guide the training for the initial feature extraction model through the preset high discriminative loss function, the present disclosure further provides a specific implementation through FIG. 3, the flow 300 of which includes the following steps:

Step 301, obtaining guidance information by using a high discriminative loss function to guide a normalization processing process of a normalization processing module for an initial feature vector.

As shown in FIG. 3A, the object of the high discriminative loss function refers to a normalized feature vector outputted by the normalization processing module. Therefore, the training guidance direction provided by the loss function is directly directed to the normalized feature vector, that is, by directly providing guidance information to the output result of the normalization processing module, the normalization processing module can adjust module parameters according to the correction direction given by the guidance information.

Step 302, controlling the normalization processing module to guide an image feature extraction process of a basic feature extraction module in reverse by the guidance information.

Based on step 301, this step is intended to control, by the above executing body, the normalization processing module to guide the image feature extraction process of the basic feature extraction module in reverse by the guidance information. That is, in the case where the high discriminative loss function directly acts on the normalization processing module, the normalization processing module is further required to transmit the guidance information to the basic feature extraction module at the upper layer in a reverse direction, such that the basic feature extraction module also modifies its own module parameters according to the guidance information, thereby outputting an initial feature vector more in line with the guidance requirement to the normalization processing module.

Figure 4A:
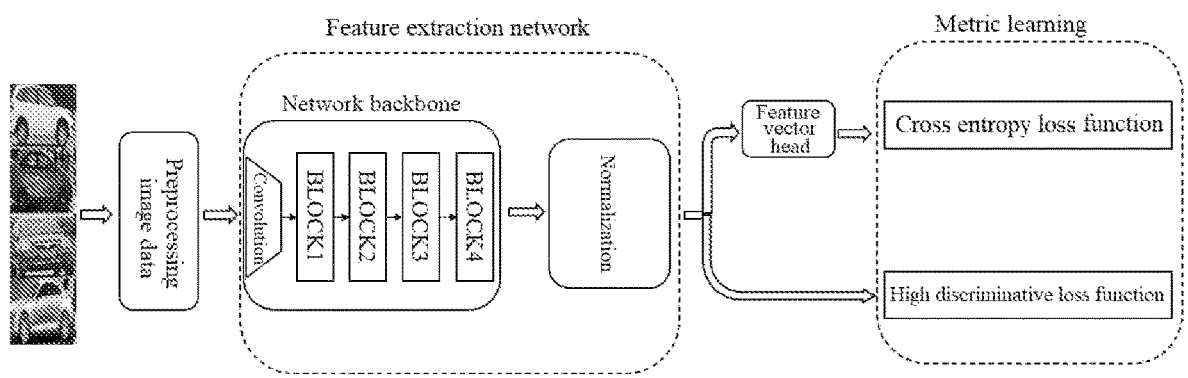
FIG. 4A is a schematic structural diagram of a model corresponding to the scheme of FIG. 3, provided by an embodiment of the present disclosure.

On the basis of the schemes provided in FIGS. 3 and 4A, considering that it is possible that the guidance information returned to the normalization processing module can not be well understood by the basic feature extraction module of the upper layer in the situation where the high discriminative loss function only acts directly on the normalized feature vector outputted by the normalization processing module, which makes the effect of each update of the basic feature extraction module in the training iteration process not good, which may result in the need for more iteration times and training time.

Figure 4B:
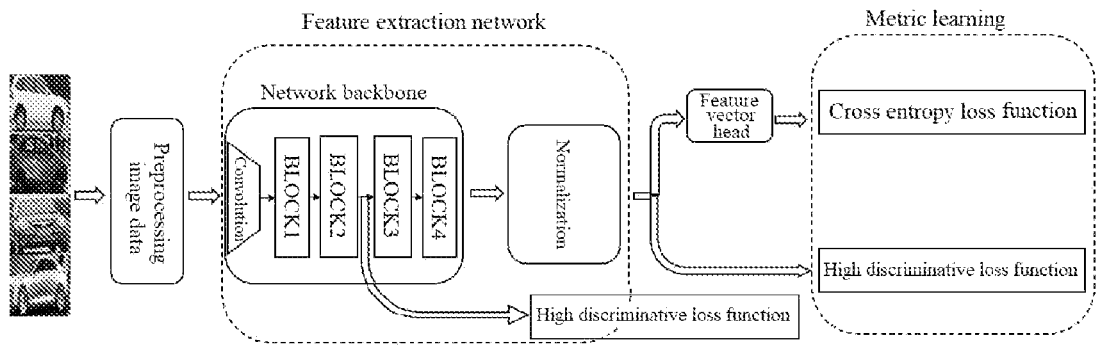
FIG. 4B is a schematic structural diagram of a model different from FIG. 4A, provided by an embodiment of the present disclosure.

For this problem, when the basic feature extraction module contains a plurality of feature extraction sub-modules connected in sequence, the high discriminative loss function is additionally used to guide a feature extraction process of at least one of the feature extraction sub-modules. That is, as shown in FIG. 4B, in addition to reserving the guidance of the loss function for the connection in FIG. 4A, an information feedback connection between the high discriminative loss function and a second BLOCK (functional module) is additionally provided, which is equivalent to the new addition of the guidance of the high discriminative loss function for the image feature extraction process of the basic feature extraction module. Compared with an indirect guidance, it is obvious that the direct guidance will have a better effect, thereby shortening the training time consumption and improving the training efficiency.

Figure 5:
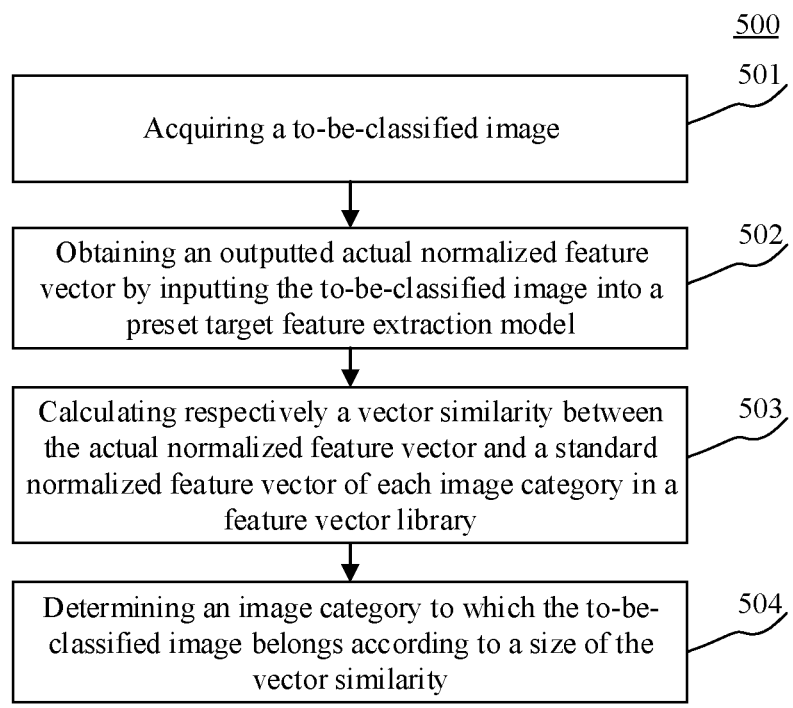
FIG. 5 is a flowchart of a method for classifying an image provided by an embodiment of the present disclosure.

The above embodiments illustrate how to train and obtain a target feature extraction model from various aspects. In order to emphasize as much as possible the effect of the trained target feature extraction model from an actual use scenario, the present disclosure further provides a scheme of solving an actual problem using the trained target feature extraction model. Referring to the flow 500 shown in FIG. 5, a method for classifying an image includes the following steps:

Step 501, acquiring a to-be-classified image.

This step is intended to acquire, by an executing body (e.g., the server 105 shown in FIG. 1 or another server different from the server 105) that is responsible for performing the method for classifying an image, the to-be-classified image. For example, a to-be-classified image inputted by a user is received via a network, and the to-be-classified image may be contained in an image category determination request initiated by the user.

Step 502, obtaining an outputted actual normalized feature vector by inputting the to-be-classified image into a preset target feature extraction model.

The target feature extraction model called or used in this step is the target feature extraction model trained in the above embodiment. That is, the actual normalized feature vector corresponding to the to-be-classified image is finally outputted through the normalization processing module.

Step 503, calculating respectively a vector similarity between the actual normalized feature vector and a standard normalized feature vector of each image category in a feature vector library.

Based on step 502, this step is intended to respectively calculate, by the above executing body, the vector similarity between the actual normalized feature vector and the standard normalized feature vector of the each image category in the feature vector library.

That is, the feature vector library is pre-constructed, and the feature vector library contains standard normalized feature vectors of a plurality of image categories for representing the feature vectors of the image categories. The standard normalized feature vector may be obtained by outputting a standard image of the image category by the target feature extraction model, or may be obtained by synthesizing features outputted respectively by the above target feature extraction model for a plurality of common images under the image category, which will not be specifically limited here.

Step 504, determining an image category to which the to-be-classified image belongs according to a size of the vector similarity.

Based on step 503, this step is intended to determine, by the above executing body, the image category to which the to-be-classified image belongs according to the size of the vector similarity.

In practice, an image category to which a target standard normalized feature vector having a maximum vector similarity belongs may be generally determined as the image category to which the to-be-classified image belongs. Alternatively, just in case, some image categories having top-ranked vector similarities are once outputted for the user to subsequently perform a direct selection to finally determine the image category approved by the user.

According to the method for classifying an image provided in this embodiment, on the basis that the normalization processing module is added to perform the normalization processing on the initial feature vector outputted by the basic feature extraction module, a preset high discriminative loss function is additionally introduced. The high discriminative loss function is abstractly obtained based on a preset upper limit and a preset lower limit of a vector similarity that are preset respectively for sample images of any two image categories according to whether two images have the similarity, and the preset upper limit is greater than the preset lower limit. Therefore, the feature extraction model can be guided in generating image feature vector having a significant discrimination when the vector similarity is calculated, which is conducive to obtaining a more accurate image classification result of a category to which an image belongs.

Figure 6:
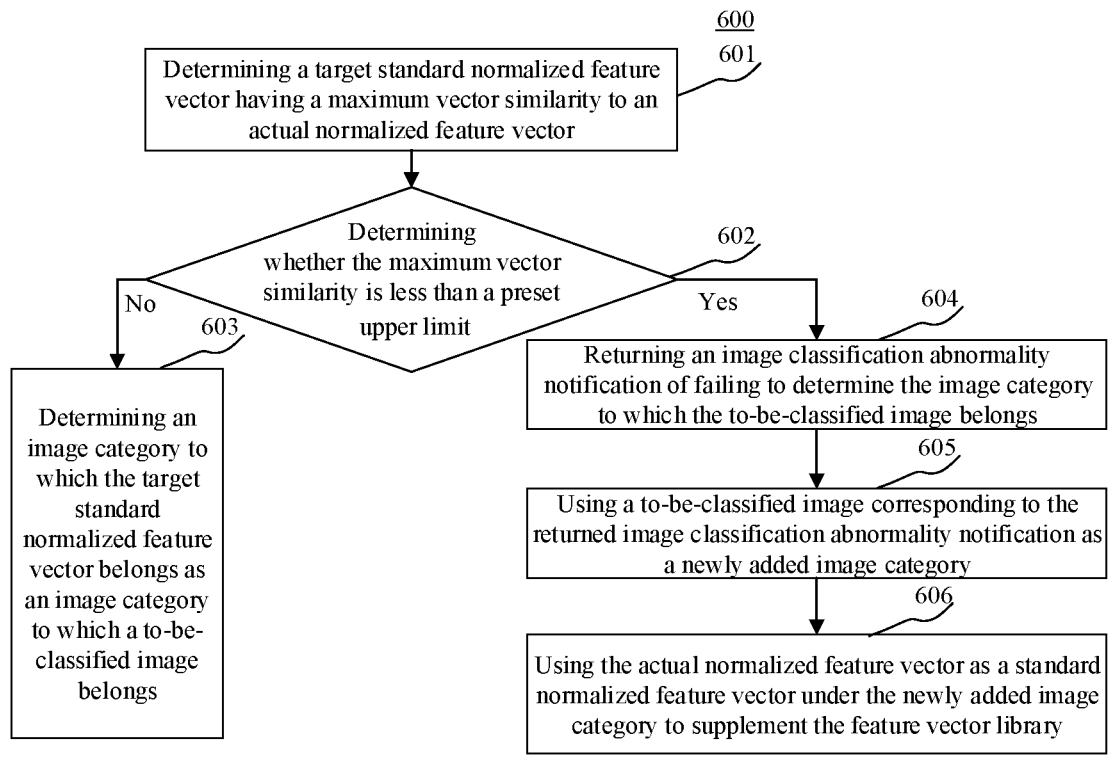
FIG. 6 is a flowchart of a method for determining an image category according to a vector similarity provided by an embodiment of the present disclosure.

Referring to FIG. 6, FIG. 6 is a flowchart of a method for determining an image category according to a vector similarity. That is, for step 504 in the flow 500 shown in FIG. 5, a specific implementation is provided. The other steps in the flow 500 are not adjusted, and a new complete embodiment is obtained by replacing step 504 with the specific implementation provided in this embodiment. Here, a flow 600 includes the following steps:

Step 601, determining a target standard normalized feature vector having a maximum vector similarity to an actual normalized feature vector.

That is, this embodiment adopts a scheme of determining an image category to which the target standard normalized feature vector having the maximum vector similarity belongs as an image category to which a to-be-classified image belongs.

Step 602, determining whether the maximum vector similarity is less than a preset upper limit; if the maximum vector similarity is less than the preset upper limit, performing step 604; otherwise, performing step 603.

Based on step 601, after the target standard normalized feature vector is determined and before the image category to which the to-be-classified image belongs is determined, this step is intended to determine, by the above executing body, whether the maximum vector similarity is less than the preset upper limit, to select a different subsequent processing branch according to the determination result.

Step 603, determining an image category to which the target standard normalized feature vector belongs as an image category to which a to-be-classified image belongs.

This step is based on the determination result in step 602 that the maximum vector similarity is not less than the preset upper limit, indicating that the maximum vector similarity exceeds the preset upper limit. The preset upper limit is a minimum value used to be capable of representing that two images belong to images of one category. Then, if the minimum value is exceeded, it is certainly possible to determine the image category to which the target standard normalized feature vector belongs as the image category to which the to-be-classified image belongs.

Step 604, returning an image classification abnormality notification of failing to determine the image category to which the to-be-classified image belongs.

Different from step 603, this step is based on the determination result in step 602 that the maximum vector similarity is less than the preset upper limit, indicating that the maximum vector similarity does not exceed the preset upper limit. The preset upper limit is the minimum value used to be capable of representing that the two images belong to the images of one category. Then, if the minimum value is not exceeded, it is certainly impossible to determine the image category to which the target standard normalized feature vector belongs as the image category to which the to-be-classified image belongs, and thus, only the image classification abnormality notification of failing to determine the image category to which the to-be-classified image belongs can be returned, so as to make the situation known through this notification.

Step 605, using a to-be-classified image corresponding to the returned image classification abnormality notification as a newly added image category.

Based on step 604, this step is intended to further use, by the above executing body, the to-be-classified image corresponding to the returned image classification abnormality notification as the newly added image category. Just in case, it can further be determined whether the maximum vector similarity is also less than a preset lower limit. If the maximum vector similarity is also less than the preset lower limit, it is possible just in case to consider that there is no image category identical to the to-be-classified image in a feature vector library, and therefore, the to-be-classified image can be more powerfully used as the newly added image category.

Step 606, using the actual normalized feature vector as a standard normalized feature vector under the newly added image category to supplement the feature vector library.

Based on step 605, this step is intended to use, by the above executing body, the actual normalized feature vector as the standard normalized feature vector under the newly added image category to supplement the feature vector library. That is, in the situation of only one image, only the actual normalized feature vector of the to-be-classified image can be used as the standard normalized feature vector of this category of image. If more such images are subsequently received, an original standard normalized feature vector can be synthesized and updated according to the actual normalized feature vectors of the subsequent images, to obtain a more representative standard normalized feature vector.

Figure 7:
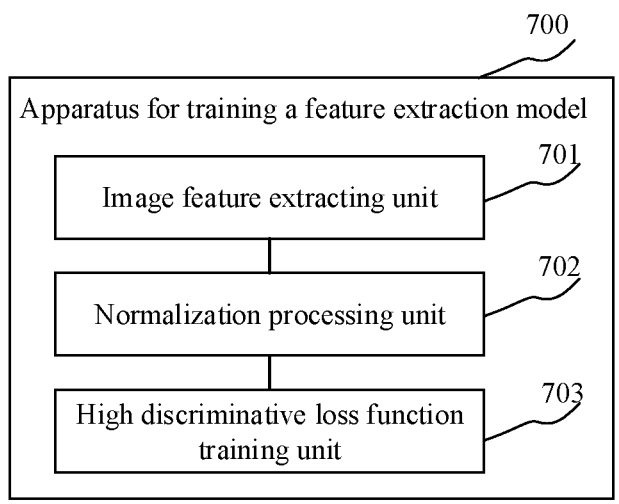
FIG. 7 is a structural block diagram of an apparatus for training a feature extraction model provided by an embodiment of the present disclosure.
Figure 8:
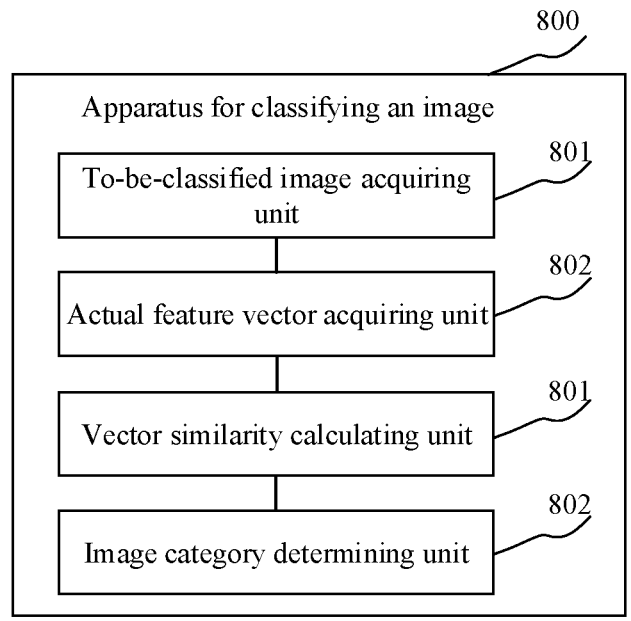
FIG. 8 is a structural block diagram of an apparatus for classifying an image provided by an embodiment of the present disclosure.

Further referring to FIGS. 7 and 8, as implementations of the methods shown in the above drawings, the present disclosure respectively provides an embodiment of an apparatus for training a feature extraction model and an embodiment of an apparatus for classifying an image. The embodiment of the apparatus for training a feature extraction model corresponds to the embodiment of the method for training a feature extraction model shown in FIG. 2, and the embodiment of the apparatus for classifying an image corresponds to the embodiment of the method for classifying an image. The above apparatuses may be applied in various electronic devices.

As shown in FIG. 7, an apparatus 700 for training a feature extraction model in this embodiment may include: an image feature extracting unit 701, a normalization processing unit 702 and a high discriminative loss function training unit 703. Here, the image feature extracting unit 701 is configured to extract an image feature of each sample image in a sample image set using a basic feature extraction module of an initial feature extraction model, to obtain an initial feature vector set. Here, the sample image set contains sample images of a plurality of image categories, and the each sample image is annotated with an image category to which the sample image belongs. The normalization processing unit 702 is configured to perform normalization processing on each initial feature vector in the initial feature vector set using a normalization processing module of the initial feature extraction model, to obtain each normalized feature vector. The high discriminative loss function training unit 703 is configured to guide training for the initial feature extraction model through a preset high discriminative loss function, to obtain a target feature extraction model as a training result. Here, the high discriminative loss function is abstractly obtained based on a preset upper limit and a preset lower limit of a vector similarity that are preset respectively for sample images of any two image categories according to whether two images have a similarity, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

In this embodiment, for specific processes of the image feature extracting unit 701, the normalization processing unit 702 and the high discriminative loss function training unit 703 in the apparatus 700 for training a feature extraction model, and their technical effects, reference may be respectively made to related descriptions of steps 201-203 in the corresponding embodiment of FIG. 2, and thus, the details will not be repeatedly described here.

In some alternative implementations of this embodiment, the high discriminative loss function training unit 703 may further be configured to:

obtain guidance information by using the high discriminative loss function to guide a normalization processing process of the normalization processing module for an initial feature vector; and control the normalization processing module to guide an image feature extraction process of the basic feature extraction module in reverse by the guidance information.

In some alternative implementations of this embodiment, the apparatus 700 for training a feature extraction model may further include:

an additional guiding unit, configured to use, in response to the basic feature extraction module containing a plurality of feature extraction sub-modules connected in sequence, the high discriminative loss function additionally to guide a feature extraction process of at least one of the feature extraction sub-modules.

In some alternative implementations of this embodiment, a similarity difference between the preset upper limit and the preset lower limit is not less than half of a complete similarity interval.

As shown in FIG. 8, an apparatus 800 for classifying an image in this embodiment may include: a to-be-classified image acquiring unit 801, an actual feature vector acquiring unit 802, a vector similarity calculating unit 803 and an image category determining unit 804. Here, the to-be-classified image acquiring unit 801 is configured to acquire a to-be-classified image. The actual feature vector acquiring unit 802 is configured to obtain an outputted actual normalized feature vector by inputting the to-be-classified image into a preset target feature extraction model. Here, the target feature extraction model is obtained according to the apparatus 700 for training a feature extraction model. The vector similarity calculating unit 803 is configured to calculate respectively a vector similarity between the actual normalized feature vector and a standard normalized feature vector of each image category in a feature vector library. The image category determining unit 804 is configured to determine an image category to which the to-be-classified image belongs according to a size of the vector similarity.

In this embodiment, for specific processes of the to-be-classified image acquiring unit 801, the actual feature vector acquiring unit 802, the vector similarity calculating unit 803 and the image category determining unit 804 in the apparatus 800 for classifying an image, and their technical effects, reference may be respectively made to the related descriptions in the corresponding method embodiment, and thus, the details will not be repeatedly described here.

In some alternative implementations of this embodiment, the image category determining unit 804 may further be configured to:

determine a target standard normalized feature vector having a maximum vector similarity to the actual normalized feature vector; and determine, in response to the maximum vector similarity being not less than a preset upper limit, an image category to which the target standard normalized feature vector belongs as the image category to which the to-be-classified image belongs.

In some alternative implementations of this embodiment, the apparatus 800 for classifying an image may further include:

an image classification abnormality notification returning unit, configured to return, in response to the maximum vector similarity being less than the preset upper limit, an image classification abnormality notification of failing to determine the image category to which the to-be-classified image belongs.

In some alternative implementations of this embodiment, the apparatus 800 for classifying an image may further include:

a newly added image category determining unit, configured to use a to-be-classified image corresponding to the returned image classification abnormality notification as a newly added image category; and a feature vector library supplementing unit, configured to use the actual normalized feature vector as a standard normalized feature vector under the newly added image category to supplement the feature vector library.

This embodiment exists as an apparatus embodiment corresponding to the above method embodiments. According to the apparatus for training a feature extraction model and the apparatus for classifying an image provided in this embodiment, on the basis that the normalization processing module is added to perform the normalization processing on the initial feature vector outputted by the basic feature extraction module, the preset high discriminative loss function is additionally introduced. The high discriminative loss function is abstractly obtained based on the preset upper limit and the preset lower limit of the vector similarity that are preset respectively for the sample images of any two image categories according to whether the two images have the similarity, and the preset upper limit is greater than the preset lower limit. Therefore, the feature extraction model can be guided in generating image feature vector having a significant discrimination when the vector similarity is calculated, which is conducive to obtaining a more accurate image classification result of a category to which an image belongs.

According to an embodiment of the present disclosure, the present disclosure further provides an electronic device. The electronic device includes at least one processor, and a storage device in communication with the at least one processor. Here, the storage device stores instructions executable by the at least one processor, and the instructions are executed by the at least one processor, to enable the at least one processor to implement the method for training a feature extraction model and/or the method for classifying an image described in any of the above embodiments.

According to an embodiment of the present disclosure, the present disclosure further provides a readable storage medium. The readable storage medium stores a computer instruction. The computer instruction is used to enable the computer to implement the method for training a feature extraction model and/or the method for classifying an image described in any of the above embodiments.

According to an embodiment of the present disclosure, the present disclosure further provides a computer program product. A computer program, when executed by a processor, implements the method for training a feature extraction model and/or the method for classifying an image described in any of the above embodiments.

Figure 9:
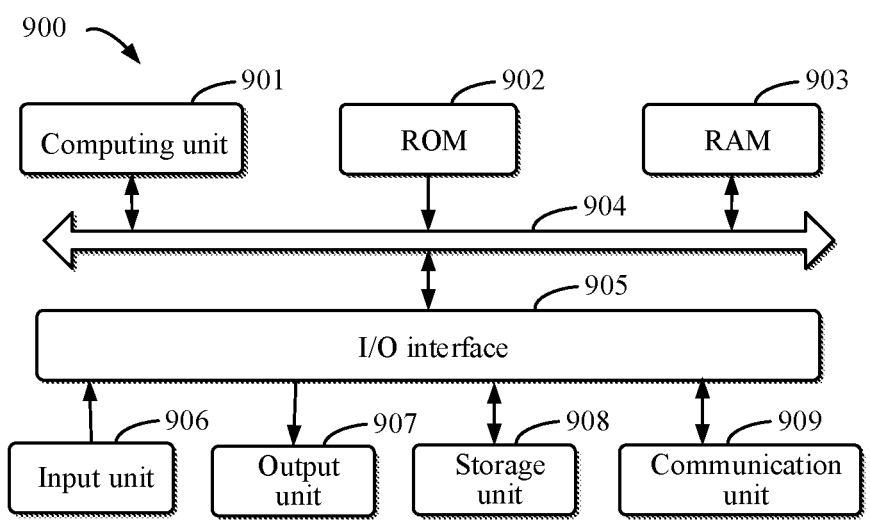
FIG. 9 is a schematic structural diagram of an electronic device adapted to perform the method for training a feature extraction model and/or the method for classifying an image, provided by an embodiment of the present disclosure.

FIG. 9 is a schematic block diagram of an exemplary electronic device 900 that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device, and other similar computing apparatuses. The parts shown herein, their connections and relationships, and their functions are only as examples, and not intended to limit implementations of the present disclosure as described and/or claimed herein.

As shown in FIG. 9, the device 900 includes a computation unit 901, which may execute various appropriate actions and processes in accordance with a computer program stored in a read-only memory (ROM) 902 or a computer program loaded into a random access memory (RAM) 903 from a storage unit 908. The RAM 903 also stores various programs and data required by operations of the device 900. The computation unit 901, the ROM 902 and the RAM 903 are connected to each other through a bus 904. An input/output (I/O) interface 909 is also connected to the bus 904.

The following components in the device 900 are connected to the I/O interface 905: an input unit 906, for example, a keyboard and a mouse; an output unit 907, for example, various types of displays and a speaker; a storage device 908, for example, a magnetic disk and an optical disk; and a communication unit 909, for example, a network card, a modem, a wireless communication transceiver. The communication unit 909 allows the device 900 to exchange information/data with another device through a computer network such as the Internet and/or various telecommunication networks.

The computation unit 901 may be various general-purpose and/or special-purpose processing assemblies having processing and computing capabilities. Some examples of the computation unit 901 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 901 performs the various methods and processes described above, for example, the method for training a feature extraction model and/or classifying an image. For example, in some embodiments, the method for training a feature extraction model and/or classifying an image may be implemented as a computer software program, which is tangibly included in a machine readable medium, for example, the storage device 908. In some embodiments, part or all of the computer program may be loaded into and/or installed on the device 900 via the ROM 902 and/or the communication unit 909. When the computer program is loaded into the RAM 903 and executed by the computation unit 901, one or more steps of the above method for training a feature extraction model and/or classifying an image may be performed. Alternatively, in other embodiments, the computation unit 901 may be configured to perform the method for training a feature extraction model and/or classifying an image through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host. It is a host product in the cloud computing service system, to solve the defects of difficult service management and weak business scalability in the service of the traditional physical host and Virtual Private Server (VPS, Virtual Private Server).

In the technical solution of the embodiments of the present disclosure, on the basis that a normalization processing module is added to perform normalization processing on an initial feature vector outputted by a basic feature extraction module, a preset high discriminative loss function is additionally introduced. The high discriminative loss function is abstractly obtained based on a preset upper limit and a preset lower limit of a vector similarity that are preset respectively for sample images of any two image categories according to whether two images have the similarity, and the preset upper limit is greater than the preset lower limit. Therefore, the feature extraction model can be guided in generating image feature vector having a significant discrimination when the vector similarity is calculated, which is conducive to obtaining a more accurate image classification result of a category to which an image belongs.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for training a feature extraction model, comprising:
    extracting an image feature of each sample image in a sample image set using a basic feature extraction module of an initial feature extraction model, to obtain an initial feature vector set, wherein the sample image set contains sample images of a plurality of image categories, and the each sample image is annotated with an image category to which the sample image belongs;
    performing normalization processing on each initial feature vector in the initial feature vector set using a normalization processing module of the initial feature extraction model, to obtain each normalized feature vector; and
    guiding training for the initial feature extraction model through a preset high discriminative loss function, to obtain a target feature extraction model as a training result, wherein the high discriminative loss function is abstractly obtained based on a preset upper limit and a preset lower limit of a vector similarity that are preset respectively for sample images of any two image categories according to whether two images have a similarity, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

2. The method according to claim 1, wherein the guiding training for the initial feature extraction model through a preset high discriminative loss function comprises:
    obtaining guidance information by using the high discriminative loss function to guide a normalization processing process of the normalization processing module for an initial feature vector; and
    controlling the normalization processing module to guide an image feature extraction process of the basic feature extraction module in reverse by the guidance information.

3. The method according to claim 2, further comprising:
    using, in response to the basic feature extraction module containing a plurality of feature extraction sub-modules connected in sequence, the high discriminative loss function additionally to guide a feature extraction process of at least one of the feature extraction sub-modules.

4. The method according to claim 1, wherein a similarity difference between the preset upper limit and the preset lower limit is not less than half of a complete similarity interval.

5. The method according to claim 1, further comprising:
    acquiring a to-be-classified image;
    obtaining an outputted actual normalized feature vector by inputting the to-be-classified image into the target feature extraction model;
    calculating respectively a vector similarity between the actual normalized feature vector and a standard normalized feature vector of each image category in a feature vector library; and
    determining an image category to which the to-be-classified image belongs according to a size of the vector similarity.

6. The method according to claim 5, wherein the determining an image category to which the to-be-classified image belongs according to a size of the vector similarity comprises:
    determining a target standard normalized feature vector having a maximum vector similarity to the actual normalized feature vector; and
    determining, in response to the maximum vector similarity being not less than the preset upper limit, an image category to which the target standard normalized feature vector belongs as the image category to which the to-be-classified image belongs.

7. The method according to claim 6, further comprising:
    returning, in response to the maximum vector similarity being less than the preset upper limit, an image classification abnormality notification of failing to determine the image category to which the to-be-classified image belongs.

8. The method according to claim 7, further comprising:
    using a to-be-classified image corresponding to the returned image classification abnormality notification as a newly added image category; and
    using the actual normalized feature vector as a standard normalized feature vector under the newly added image category to supplement the feature vector library.

9. An electronic device, comprising:
    at least one processor; and
    a storage device, in communication with the at least one processor,
    wherein the storage device stores instructions executable by the at least one processor, and the instructions are executed by the at least one processor, to enable the at least one processor to perform operations for training a feature extraction model, the operations comprising:
    extracting an image feature of each sample image in a sample image set using a basic feature extraction module of an initial feature extraction model, to obtain an initial feature vector set, wherein the sample image set contains sample images of a plurality of image categories, and the each sample image is annotated with an image category to which the sample image belongs;
    performing normalization processing on each initial feature vector in the initial feature vector set using a normalization processing module of the initial feature extraction model, to obtain each normalized feature vector; and guiding training for the initial feature extraction model through a preset high discriminative loss function, to obtain a target feature extraction model as a training result, wherein the high discriminative loss function is abstractly obtained based on a preset upper limit and a preset lower limit of a vector similarity that are preset respectively for sample images of any two image categories according to whether two images have a similarity, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

10. The electronic device according to claim 9, wherein the guiding training for the initial feature extraction model through a preset high discriminative loss function comprises:

obtaining guidance information by using the high discriminative loss function to guide a normalization processing process of the normalization processing module for an initial feature vector; and controlling the normalization processing module to guide an image feature extraction process of the basic feature extraction module in reverse by the guidance information.

11. The electronic device according to claim 10, the operations further comprising:

using, in response to the basic feature extraction module containing a plurality of feature extraction sub-modules connected in sequence, the high discriminative loss function additionally to guide a feature extraction process of at least one of the feature extraction sub-modules.

12. The electronic device according to claim 9, wherein a similarity difference between the preset upper limit and the preset lower limit is not less than half of a complete similarity interval.

13. The electronic device according to claim 9, the operations further comprising:

acquiring a to-be-classified image;

obtaining an outputted actual normalized feature vector by inputting the to-be-classified image into the target feature extraction model;

calculating respectively a vector similarity between the actual normalized feature vector and a standard normalized feature vector of each image category in a feature vector library; and determining an image category to which the to-be-classified image belongs according to a size of the vector similarity.

14. The electronic device according to claim 13, wherein the determining an image category to which the to-be-classified image belongs according to a size of the vector similarity comprises:

determining a target standard normalized feature vector having a maximum vector similarity to the actual normalized feature vector; and determining, in response to the maximum vector similarity being not less than the preset upper limit, an image category to which the target standard normalized feature vector belongs as the image category to which the to-be-classified image belongs.

15. The electronic device according to claim 14, the operations further comprising:

returning, in response to the maximum vector similarity being less than the preset upper limit, an image classification abnormality notification of failing to determine the image category to which the to-be-classified image belongs.

16. The electronic device according to claim 15, the operations further comprising:

using a to-be-classified image corresponding to the returned image classification abnormality notification as a newly added image category; and using the actual normalized feature vector as a standard normalized feature vector under the newly added image category to supplement the feature vector library.

17. A non-transitory computer readable storage medium, storing a computer instruction, wherein the computer instruction is used to cause a computer to perform operations for training a feature extraction model, the operations comprising:

extracting an image feature of each sample image in a sample image set using a basic feature extraction module of an initial feature extraction model, to obtain an initial feature vector set, wherein the sample image set contains sample images of a plurality of image categories, and the each sample image is annotated with an image category to which the sample image belongs;

performing normalization processing on each initial feature vector in the initial feature vector set using a normalization processing module of the initial feature extraction model, to obtain each normalized feature vector; and guiding training for the initial feature extraction model through a preset high discriminative loss function, to obtain a target feature extraction model as a training result, wherein the high discriminative loss function is abstractly obtained based on a preset upper limit and a preset lower limit of a vector similarity that are preset respectively for sample images of any two image categories according to whether two images have a similarity, a vector similarity between normalized feature vectors of two images not having a similarity is not greater than the preset lower limit, a vector similarity between normalized feature vectors of two images having a similarity is not less than the preset upper limit, and the preset upper limit is greater than the preset lower limit.

18. The storage medium according to claim 17, wherein the guiding training for the initial feature extraction model through a preset high discriminative loss function comprises:

obtaining guidance information by using the high discriminative loss function to guide a normalization processing process of the normalization processing module for an initial feature vector; and controlling the normalization processing module to guide an image feature extraction process of the basic feature extraction module in reverse by the guidance information.

19. The storage medium according to claim 18, the operations further comprising:

using, in response to the basic feature extraction module containing a plurality of feature extraction sub-modules connected in sequence, the high discriminative loss function additionally to guide a feature extraction process of at least one of the feature extraction submodules.

20. The storage medium according to claim 17, wherein a similarity difference between the preset upper limit and the preset lower limit is not less than half of a complete similarity interval.

* * * * *